(12) United States Patent
Wang

(10) Patent No.: US 12,126,648 B2
(45) Date of Patent: *Oct. 22, 2024

(54) UTILIZING TRUST TOKENS TO CONDUCT SECURE MESSAGE EXCHANGES

(71) Applicant: Visa International Service Association, San Francisco, CA (US)

(72) Inventor: Quan Wang, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 25 days.

This patent is subject to a terminal disclaimer.

(21) Appl. No.: 17/845,049

(22) Filed: Jun. 21, 2022

(65) Prior Publication Data

US 2022/0329623 A1 Oct. 13, 2022

Related U.S. Application Data

(63) Continuation of application No. 16/660,060, filed on Oct. 22, 2019, now Pat. No. 11,399,043, which is a
(Continued)

(51) Int. Cl.
*H04L 29/06* (2006.01)
*G06Q 20/22* (2012.01)
(Continued)

(52) U.S. Cl.
CPC ....... *H04L 63/1466* (2013.01); *G06Q 20/223* (2013.01); *G06Q 20/32* (2013.01);
(Continued)

(58) Field of Classification Search
CPC . H04W 12/108; H04W 12/66; H04W 12/069; H04W 12/47; H04W 12/0431;
(Continued)

(56) References Cited

U.S. PATENT DOCUMENTS 10,505,978 B2    12/2019   Wang
2009/0094452 A1    4/2009   Shao et al.
(Continued)

OTHER PUBLICATIONS

U.S. Appl. No. 15/686,055 , "Non-Final Office Action", Apr. 18, 2019, 10 pages.
(Continued)

*Primary Examiner* — Tri M Tran
(74) *Attorney, Agent, or Firm* — Kilpatrick Townsend & Stockton LLP

(57) ABSTRACT

Embodiments of the invention are directed to the utilization of trust tokens to perform secure message transactions between two devices. A trust token transmitted in a message from one device may include first data that is digitally signed by a trust provider computer, and second data that is digitally signed by the device itself. Upon receipt of a message containing a trust token, the recipient may utilize the first data to verify with the trust provider computer that the sender of the message is a trusted party. The trust provider computer may provide the recipient device the public key of the sender. The recipient may utilize the second data and the provided public key to verify that the sender signed the message and that the message is unaltered. These techniques may increase detection of relay, replay, or other man-in-the-middle attacks, decreasing the likelihood that such attacks will be successful.

20 Claims, 9 Drawing Sheets

Related U.S. Application Data continuation of application No. 15/686,055, filed on Aug. 24, 2017, now Pat. No. 10,505,978.

(51) Int. Cl.

| | | |
|---|---|---|
| *G06Q 20/32* | (2012.01) | |
| *G06Q 20/34* | (2012.01) | |
| *G06Q 20/38* | (2012.01) | |
| *H04L 9/14* | (2006.01) | |
| *H04L 9/30* | (2006.01) | |
| *H04L 9/32* | (2006.01) | |
| *H04L 9/40* | (2022.01) | |
| *H04W 12/108* | (2021.01) | |
| *H04W 12/0431* | (2021.01) | |
| *H04W 12/069* | (2021.01) | |
| *H04W 12/122* | (2021.01) | |
| *H04W 12/47* | (2021.01) | |
| *H04W 12/60* | (2021.01) | |

(52) U.S. Cl.
CPC ..... *G06Q 20/352* (2013.01); *G06Q 20/38215* (2013.01); *H04L 9/14* (2013.01); *H04L 9/30* (2013.01); *H04L 9/3213* (2013.01); *H04L 9/3247* (2013.01); *H04L 63/06* (2013.01); *H04L 63/062* (2013.01); *H04W 12/108* (2021.01); *H04L 63/0823* (2013.01); *H04L 2209/56* (2013.01); *H04W 12/0431* (2021.01); *H04W 12/069* (2021.01); *H04W 12/122* (2021.01); *H04W 12/47* (2021.01); *H04W 12/66* (2021.01)

(58) Field of Classification Search
CPC ...... H04W 12/122; H04L 9/3213; H04L 9/14; H04L 63/06; H04L 63/062; H04L 9/30; H04L 63/1466; H04L 9/3247; H04L 2209/56; H04L 63/0823; G06Q 20/38215; G06Q 20/32; G06Q 20/223; G06Q 20/352
See application file for complete search history.

(56) References Cited

U.S. PATENT DOCUMENTS

| | | |
|---|---|---|
| 2012/0102318 A1 | 4/2012 | Vanstone |
| 2012/0144195 A1 | 6/2012 | Nair et al. |
| 2013/0018911 A1* | 1/2013 | Liu .................. H04L 9/00 707/769 |
| 2013/0227289 A1* | 8/2013 | Du .................. H04L 9/3213 713/168 |
| 2013/0232551 A1 | 9/2013 | Du et al. |
| 2013/0308778 A1 | 11/2013 | Fosmark et al. |
| 2014/0281533 A1 | 9/2014 | de Andrade et al. |
| 2018/0322311 A1 | 11/2018 | Kobayashi |
| 2018/0337784 A1 | 11/2018 | Jain et al. |
| 2019/0334718 A1 | 10/2019 | Li et al. |

OTHER PUBLICATIONS

U.S. Appl. No. 15/686,055 , "Notice of Allowance", Aug. 7, 2019, 15 pages.
U.S. Appl. No. 16/660,060 , "Non-Final Office Action", Nov. 10, 2021, 17 pages.
U.S. Appl. No. 16/660,060 , "Notice of Allowance", Mar. 22, 2022, 7 pages.
PCT/US2018/035659 , "International Preliminary Report on Patentability", Mar. 5, 2020, 9 pages.
PCT/US2018/035659 , "International Search Report and Written Opinion", Oct. 8, 2018, 12 pages.

* cited by examiner

UTILIZING TRUST TOKENS TO CONDUCT SECURE MESSAGE EXCHANGES

CROSS-REFERENCES TO RELATED APPLICATIONS

The present application is a continuation of U.S. patent application Ser. No. 16/660,060, filed on Oct. 22, 2019, which is a continuation of U.S. patent application Ser. No. 15/686,055 filed on Aug. 24, 2017, the entire disclosures of which are incorporated by reference herein in their entireties for all purposes.

BACKGROUND

Embodiments of the invention are directed to systems and methods related to utilizing trust tokens in conduct secure message exchanges.

The Internet has made it increasingly easy for users to conduct electronic transactions using computing devices (e.g., mobile phones, tablet computers). However, it has also increased the risks of fraudulent transactions, as well as the risk of data being compromised. Specifically, conventional systems may be susceptible to relay/replay attacks and man-in-the-middle (MITM) attacks. During such attacks, an attacker secretly intercepts, relays, and possibly alters communication between two parties who believe they are directly communicating with each other.

To secure against such attacks, some conventional systems require validation for exchanged messages. Some systems require an exchange of public keys in addition to the message being transmitted over a secure channel. In some systems, tokens may be provided to a device and transactions conducted with the token are verified by a server computer. However, these exchanges may also be susceptible to relay, replay, and MITM attacks in which an attacker may intercept, and in some cases change, message data. Thus, there is a need for an attack recognition mechanism that can address these problems, preferably without substantially changing existing infrastructures.

Embodiments of the invention address these and other problems, individually and collectively.

BRIEF SUMMARY

One embodiment of the invention is directed to a method. The method comprises generating, by a computing device, a first trust token using first digitally signed data and second digitally signed data. In some embodiments, the first digitally signed data may be digitally signed by a trust provider computer and the second digitally signed data may be digitally signed by the computing device. The method further comprises transmitting, by the computing device to a recipient computing device, a first message comprising the first trust token. The method further comprises receiving, by the computing device, a second message, the second message comprising the first trust token associated with the computing device and a second trust token associated with the recipient computing device. The method further comprises determining that the second message is valid by obtaining, by the computing device from the trust provider computer, an indication that a first portion of the second trust token is valid and validating a second portion of the second trust token at the computing device. The method further comprises, in response to determining that the second message is valid, processing the content of the response.

Another embodiment of the invention is directed to a computing device comprising a processor and a computer readable medium coupled to the processor. The computer readable medium may comprise code for causing the processor to perform operations. The operations comprise generating, by a computing device, a first trust token using first digitally signed data and second digitally signed data. In some embodiments, the first digitally signed data may be digitally signed by a trust provider computer and the second digitally signed data may be digitally signed by the computing device. The operations further comprise transmitting, by the computing device to a recipient computing device, a first message comprising the first trust token. The operation further comprise receiving, by the computing device, a second message, the second message comprising the first trust token associated with the computing device and a second trust token associated with the recipient computing device. The operation further comprise determining that the second message is valid by obtaining, by the computing device from the trust provider computer, an indication that a first portion of the second trust token is valid and validating a second portion of the second trust token at the computing device. The operations further comprise, in response to determining that the second message is valid, processing the content of the response.

Another embodiment of the invention is directed to a trust provider computer for performing the operations discussed herein.

DETAILED DESCRIPTION

Figure 1:
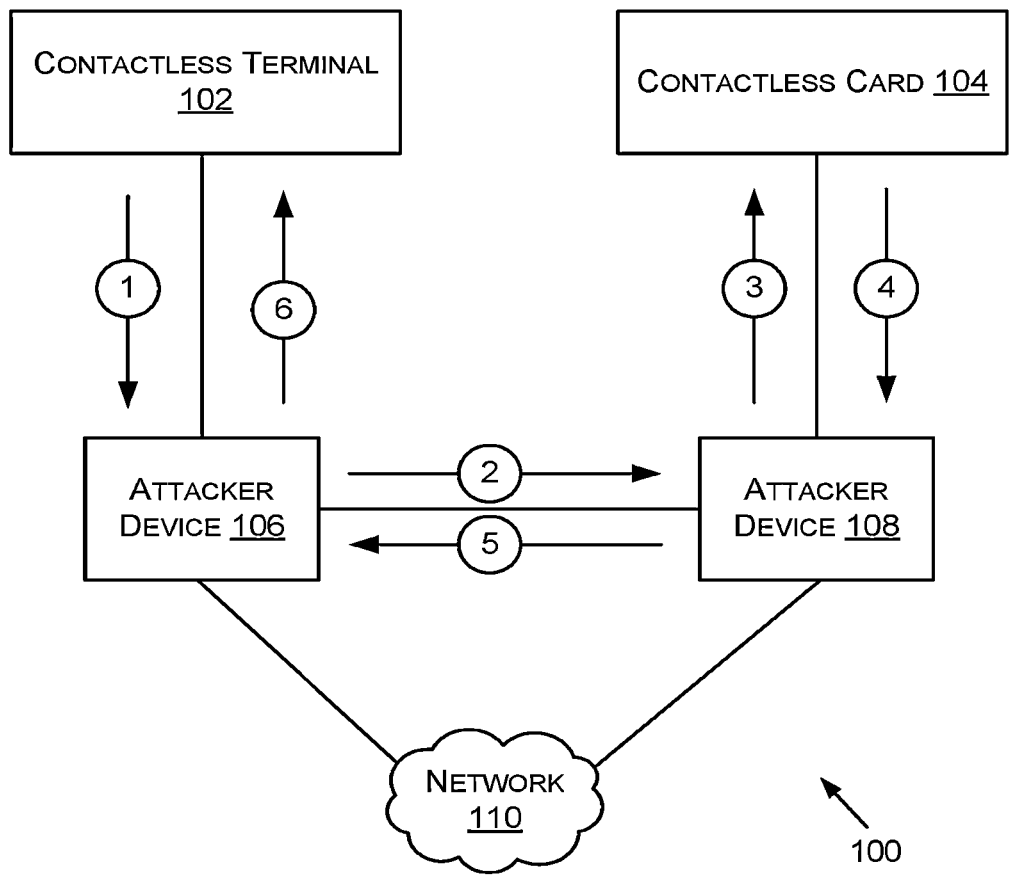
FIG. 1 depicts an exemplary relay/replay attack.

Prior to discussing specific embodiments of the invention, some terms may be described in detail.

A "computing device" may include any suitable device that can allow for communication with an external entity. A computing device may be a mobile device if the mobile device has the ability to communicate data to and from an external entity.

A "mobile computing device" may be an example of a computing device and may comprise any suitable electronic device that may be transported and operated by a user, which may also provide remote communication capabilities to a network. Examples of remote communication capabilities include using a mobile phone (wireless) network, wireless data network (e.g. 3G, 4G or similar networks), Wi-Fi, Wi-Max, or any other communication medium that may provide access to a network such as the Internet or a private network. Examples of mobile devices include mobile phones (e.g. cellular phones), PDAs, tablet computers, net books, laptop computers, personal music players, hand-held specialized readers, etc. Further examples of mobile devices include wearable devices, such as smart watches, fitness bands, ankle bracelets, rings, earrings, etc., as well as automobiles with remote communication capabilities. A mobile device may comprise any suitable hardware and software for performing such functions, and may also include multiple devices or components (e.g. when a device has remote access to a network by tethering to another device—i.e. using the other device as a modem—both devices taken together may be considered a single mobile device).

A "payment device" may include any suitable device that may be used to conduct a financial transaction, such as to provide payment credentials to a merchant. The payment device may be a software object, a hardware object, or a physical object. As examples of physical objects, the payment device may comprise a substrate such as a paper or plastic card, and information that is printed, embossed, encoded, or otherwise included at or near a surface of an object. A hardware object can relate to circuitry (e.g., permanent voltage values), and a software object can relate to non-permanent data stored on a device. A payment device may be associated with a value such as a monetary value, a discount, or store credit, and a payment device may be associated with an entity such as a bank, a merchant, a payment processing network, or a person. A payment device may be used to make a payment transaction. Suitable payment devices can be hand-held and compact so that they can fit into a user's wallet and/or pocket (e.g., pocket-sized). Example payment devices may include smart cards, magnetic stripe cards, keychain devices (such as the Speedpass™ commercially available from Exxon-Mobil Corp.), etc. Other examples of payment devices include pagers, payment cards, security cards, access cards, smart media, transponders, and the like. If the payment device is in the form of a debit, credit, or smartcard, the payment device may also optionally have features such as magnetic stripes. Such devices can operate in either a contact or contactless mode. In some embodiments, a mobile device can function as a payment device (e.g., a mobile device can store and be able to transmit payment credentials for a transaction).

A "credential" may be any suitable information that serves as reliable evidence of worth, ownership, identity, or authority. A credential may be a string of numbers, letters, or any other suitable characters, as well as any object or document that can serve as confirmation. Examples of credentials include identification cards, certified documents, access cards, passcodes and other login information, etc.

"Payment credentials" may include any suitable information associated with an account (e.g. a payment account and/or payment device associated with the account). Such information may be directly related to the account or may be derived from information related to the account. Examples of account information may include a PAN (primary account number or "account number"), user name, expiration date, CVV (card verification value), dCVV (dynamic card verification value), CVV2 (card verification value 2), CVC3 card verification values, etc. CVV2 is generally understood to be a static verification value associated with a payment device. CVV2 values are generally visible to a user (e.g., a consumer), whereas CVV and dCVV values are typically embedded in memory or authorization request messages and are not readily known to the user (although they are known to the issuer and payment processors). Payment credentials may be any information that identifies or is associated with a payment account. Payment credentials may be provided in order to make a payment from a payment account. Payment credentials can also include a user name, an expiration date, a gift card number or code, and any other suitable information.

A "trust token" may include data for verifying a message or the identity of an entity. For example, a trust token may include data (e.g., a public key signed by a trust provider computer) that may be used to verify the trust of the sender of a message. The trust token may additionally include data (e.g., a public key signed by the sender) for verifying that the message sender was the actual sender of a message. The trust token may additionally include data (e.g., message data signed by the sender) for verifying the integrity of the message data. In some cases, the data used to verify the identity of the sender is the same data that is used to verify the integrity of the message data.

A "payment token" may include an identifier for a payment account that is a substitute for an account identifier, such as a primary account number (PAN). For example, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

A "trust environment" refers to a computing environment within which trust is managed between devices associated with the computing environment. By way of example, a trust environment may utilize a public key infrastructure that is uses a pair of keys (e.g., a public key and a private key) to validate messages sent from a device within the trust environment. Public keys and private keys within a trust environment may not be utilized within other trust environments as those public/private keys are not known within the other trust environments.

A "trust provider computer" may be a server computer or other computing device that manages trust between devices. In some embodiments, a trust provider computer may manage trust between devices of differing trust environments. A trust provider computer can digitally sign data (e.g., a public key of a computing device) to provide digitally signed data that can be used to verify the trustworthiness of an entity.

An "application" may be computer code or other data stored on a computer readable medium (e.g. memory element or secure element) that may be executable by a processor to complete a task.

An "indication" may be data (e.g., an indicator) that indicates a condition. In some embodiments, an indication can be provided by an indicator (e.g., a Boolean value, a numeric value, a code, a character, etc.) that indicates that data is valid or that data is not valid. An indication may be provided by an indicator that specifies a reason as to why an action (e.g., verification) was unsuccessful. In some embodiments, an indication can be in the form of a message such that receipt of the message alone indicates that a condition exists.

A "data request message" may be an electronic message for requesting data (e.g., digitally signed data). By way of example, a data request message may include information for identifying a device. For example, a data request message may include computing device identification information (e.g. a phone number or MSISDN), a public key associated with a computing device, and/or any other suitable information. Information included in a data request message can be encrypted (e.g., with a computing-device specific key such as a private key).

A "data response message" may be a message that responds to a data request message. A data response message may include digitally signed data generated in response to the data request message. By way of example, the digitally signed data may be generated by a trust provider computer by digitally signing a public key of a computing device with a private key associated with the trust provider computer.

A "verification request message" may be an electronic message for requesting data verification. By way of example, a verification request message may include data that supposedly corresponds to data that has been digitally signed by the trust provider computer. In at least one embodiment, verification request messages may be transmitted by a computing device and received by a trust provider computer.

A "verification response message" may be a message that responds to a verification request message. A verification response message may include an indication that the data provided in a corresponding verification request message is verified or not. That is to say that the verification response message may indicate that the data provided in the verification request message was, or was not, originally signed by the trust provider computer. In some embodiments, the verification response message may include a public key associated with a computing device. In at least one embodiment, verification response messages may be transmitted by a trust provider computer and received by a computing device.

A "user" may include an individual. In some embodiments, a user may be associated with one or more personal accounts and/or user devices. The user may also be referred to as a cardholder, account holder, or consumer.

A "resource provider" may be an entity that can provide a resource such as goods, services, information, and/or access. Examples of resource providers include merchants, access devices, secure data access points, etc. A "merchant" may typically be an entity that engages in transactions and can sell goods or services, or provide access to goods or services.

A "resource provider computer" may be any computing device operated by, or on behalf of, of a resource provider. A resource provider computer may host an application running on a user device. A "user device" may include any suitable communication device and/or mobile device operated by or on behalf of a user. The resource provider may be in communication with one or more service provider computers and/or one or more transaction processing computers.

The resource provider computer may provide one or more interfaces (e.g., via a website and/or application) with which a user may perform any suitable transaction (e.g., a payment transaction).

An "acquirer" may typically be an entity (e.g., a commercial bank) that has a business relationship with a particular resource provider (e.g., a merchant) or other entity. Some entities can perform both issuer and acquirer functions. Some embodiments may encompass such single entity issuer-acquirers. An acquirer may operate an acquirer computer, which can also be generically referred to as a "transport computer."

An "authorizing entity" may be an entity that authorizes a request. Examples of an authorizing entity may be an issuer, a governmental agency, a document repository, an access administrator, etc. An "issuer" may typically refer to a business entity (e.g., a bank) that maintains an account for a user. An issuer may also issue payment credentials stored on a user device, such as a cellular telephone, smart card, tablet, or laptop to the consumer.

An "access device" may be any suitable device that provides access to a remote system. An access device may also be used for communicating with a resource provider computer, a service provider computer, a transaction processing computer, or any other suitable device and/or system. An access device may generally be located in any suitable location, such as at the location of a resource provider (e.g., a merchant). An access device may be in any suitable form. Some examples of access devices include POS or point of sale devices (e.g., POS terminals), cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, a user mobile device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device. In some embodiments, a cellular phone, tablet, or other dedicated wireless device used as a POS terminal may be referred to as a mobile point of sale or an "mPOS" terminal.

An "authorization request message" may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant calls the toll-free authorization phone number. The authorization response message may also include an authorization code, which may be a code that a credit card issuing bank returns in response to an authorization request message in an electronic message (either directly or through the transaction processing computer) to the merchant's access device (e.g. POS equipment) that indicates approval of the transaction. The code may serve as proof of authorization. As noted above, in some embodiments, a transaction processing computer may generate or forward the authorization response message to the merchant.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "processor" may refer to any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

Figure 2:
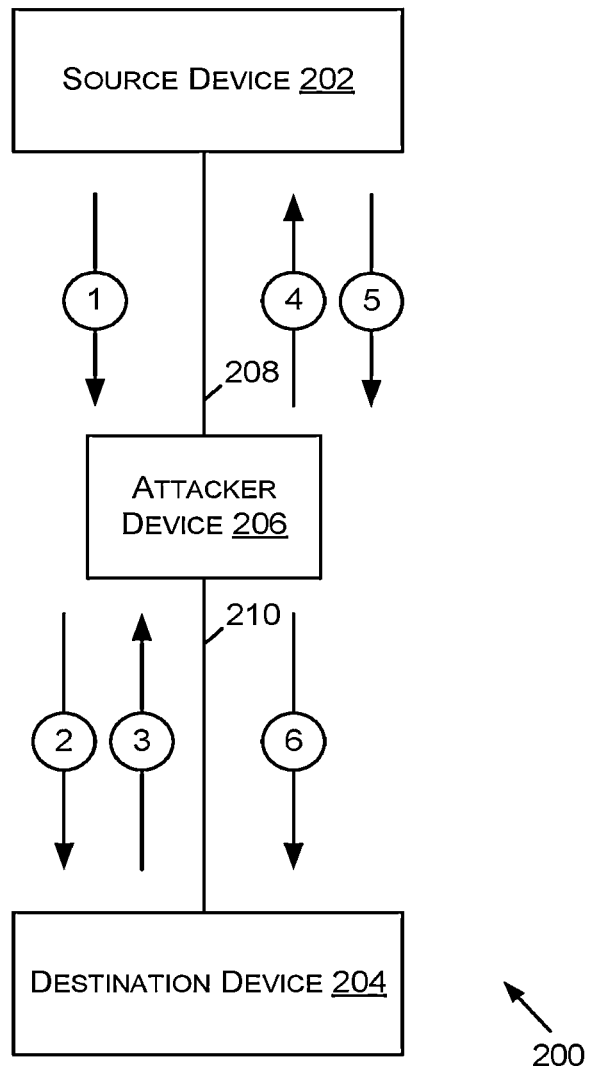
FIG. 2 depicts an exemplary man-in-the-middle attack.

As discussed above, conventional systems may be susceptible to relay, replay, or other MITM attacks. FIGS. 1 and 2 are provided below to illustrate some of these attacks.

By way of example, FIG. 1 depicts an exemplary relay attack. Contactless terminal 102 and contactless card 104 are intended to be examples of computing devices. Although the contactless terminal 102 and the contactless card 104 may be far apart in this example, an attacker (e.g., two people working together to steal information or defraud legitimate users) can use two devices (e.g., attacker device 106 and attacker device 108) to conduct a relay/replay attack. The attacker device 106 and the attacker device 108 may be connected via the network 110 (e.g., a mobile network).

In the relay attack depicted in FIG. 1, an attacker device 106 may simulate a contactless card and may be brought near the contactless terminal 102. At step 1, the contactless terminal may detect the presence of the attacker device 106 and send a message (e.g., requesting sensitive information such as payment information, an access code, etc.) to the attacker device 106. At step 2, the attacker device 106 may relay the message to the attacker device 108 that is located near the contactless card 104 (e.g., the victim's card). At step 3, the attacker device 108 may modify a source identifier field of the message to indicate that the attacker device 108 is the source of the message and relays the modified message to the contactless card 104. The contactless card 104 may respond at step 4. The attacker device 108 listens for the response and relays the response back to the attacker device 106 at step 5. At step 6, the attacker device 106 may relay the response containing the sensitive information to the contactless terminal 102. Thus, the contactless terminal 102 may be tricked by the attacker device 106 into processing the sensitive information just as it would have done were the contactless card 104 actually providing the information.

FIG. 2 depicts an exemplary man-in-the-middle attack. The source device 202 and the destination device 204 are each intended to depict a computing device. By way of example, source device 202 may be operated by a first user (or on behalf of a first entity), and the destination device 204 may be operated by a second user (or on behalf of a second entity).

A MITM attacker may intercept and alter and/or relay communications between two parties that believe they are directly communicating with each other. In some embodiments, the attacker (e.g., the attacker device 206) establishes independent connections (e.g., connection 208 and connection 210) with the victims (e.g., source device 202 and destination device 204). The attacker then eavesdrops and relays messages between the parties by impersonating each party.

In the man-in-the-middle attack depicted in FIG. 2, a message intended for destination device 204 may be sent from source device 202 at step 1. As a non-limiting example, the message sent at step 1 may request a public key from the destination device 204. The attacker device 206 may intercept the message sent at step 1 and relay the message to the destination device 204 at step 2. The destination device 204 may respond to the message at step 3. For example, the destination device 204 may provide its public key in the response message sent at step 3. The attacker device 206 may intercept the message sent at step 3. The attacker device 206 may then modify the message by replacing the public key provided by the destination device 204 with a public key of the attacker device 206. The attacker device 206 may then forward the modified message to the source device 202 at step 4. The source device 202 may then send sensitive information such as a payment account identifier via a message at step 5. The attacker device 206 may intercept the message sent at step 5, replace the payment account identifier with a different payment account identifier (e.g., a payment account associated with the attacker), and forward the modified message to the destination device 204 at step 6. Later, the destination device 204 may utilize the provided payment account information (e.g., the attacker's payment account) to provide a payment, unwittingly causing funds to be provided to the attacker's payment account rather than the intended party.

Conventional trust environments utilize a public/private key pair that may be used to verify that messages senders are who they purport to be. However, trust is not so easily established between trust environments. While a public/private key pair may be utilized within one trust environment, the public key may be unknown within the confines of a different trust environment. Thus, when to computing devices from different trust environments exchange data, it is difficult for either party to assess the trustworthiness of the other. Accordingly, these types of data exchanges heighten a risk of relay, replay, and/or MITM attacks, as an attacker may leverage this inherent trust issue to intercept and impersonate parties to the exchange.

To address these concerns, a trust provider computer may manage trust between trust environments such that devices may retain their public/private keys from their respective trust environments, and utilize those same keys for data exchanges with devices outside the trust environment. For example, a device associated with a first trust environment may provide its public key to a trust provider computer. The trust provider computer can sign the public key using a signing algorithm and a private key associated with the trust provider computer and provide the signed data back to the device.

The device may then transmit a message to another device that is associated with a different trust environment. The device may include the data signed by the trust provider computer within the message. In some embodiments, the message may further include second signed data that has been signed with the private key of the sending device. Once in receipt of the message, the recipient device may verify the identity of the sending device using the first signed data. For example, the recipient device may provide the first signed data to the trust provider computer and request verification from the trust provider computer that the sending device is a trusted device. If the trust provider computer verifies that the first signed data corresponds to a trusted device, the recipient device may be informed by the trust provider computer that the sending device is trusted. If the trust provider computer determines that the first signed data does not correspond to a trusted device, the trust provider computer may inform the recipient device that the sending device is untrusted.

In some embodiments, the trust provider computer may provide a public key associated with the trusted device. For example, the trust provider computer may send the public key associated with the sending device. The recipient device may utilize the public key of the sending device to verify that the integrity of the message and that the correct private key was used to sign the message.

In some embodiments, sending devices may further include a source identifier (e.g., a device identifier identifying the sending device, a public key of the sending device, etc.) and/or a nonce (e.g., random number) within transmitted messages. This data may be stored and tracked by the sending device. Should the message be intercepted and forwarded by an attacker (such as in a replay attack), the sender of the original message may utilize the source identifier and/or nonce to determine the validity of the message received. For example, if such data does not match the sender's stored data (of the original message), the sender may determine that the received message is not valid.

It should be appreciated that any suitable number of remedial actions (e.g., discarding the message, notifying a user, etc.) may be performed by the recipient device in response to determining that the sender is untrusted, that the message has been tampered with, or that the message data does not match stored message data.

By utilizing the techniques described above, devices of different trust environments may verify the trust of a sending device and the integrity of a received message which increases the likelihood of attack detection and decreases the risk that such attacks will be successful.

Figure 3:
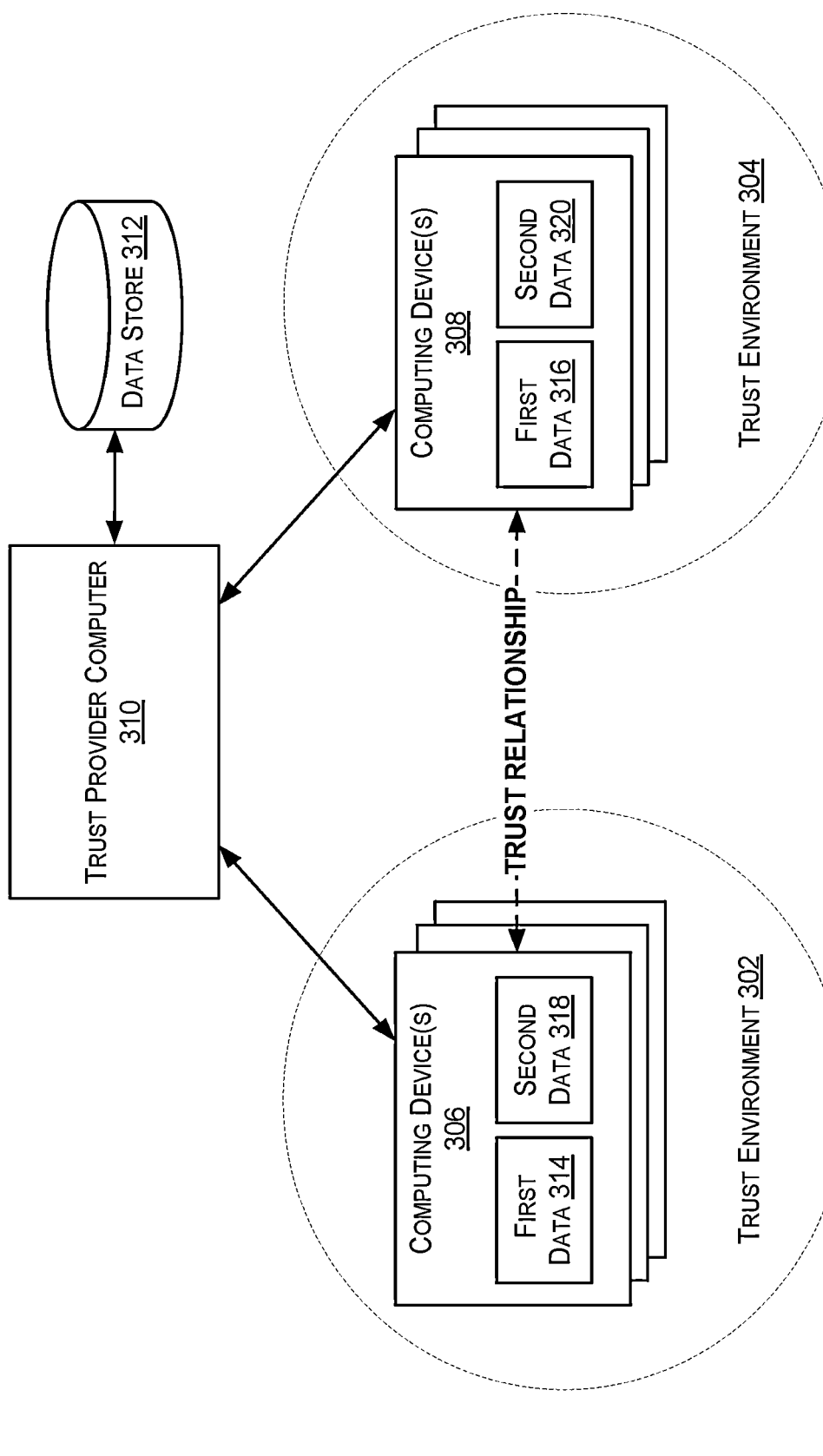
FIG. 3 depicts a block diagram of an exemplary system for establishing trust between two trust environments, according to some embodiments.

FIG. 3 depicts a block diagram of an exemplary system 300 for establishing trust between two trust environments (e.g., trust environment 302 and trust environment 304), according to some embodiments. The system 300 includes computing device(s) 306, computing device(s) 308, and a trust provider computer 310. Each of these systems and computers may be in operative communication with each other. For simplicity of illustration, a certain number of components are shown in FIG. 3. However, it should be appreciated that embodiments of the invention may include more than one of each component. In addition, some embodiments of the invention may include fewer than or greater than all of the components shown in FIG. 3. In addition, the components in FIG. 3 may communicate via any suitable communication medium using any suitable communications protocol.

Suitable communications medium for communications between the components shown in FIG. 3 may include any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

Messages between the components of FIG. 3 may be transmitted using a communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

Computing device(s) 306 and computing device(s) 308 may be examples of computing devices and may be in any suitable form. Examples of computing device(s) 306 and computing device(s) 308 may include any device capable of accessing the Internet, such as a personal computer, cellular or wireless phones, personal digital assistants (PDAs), tablet computers, laptop computers, and handheld specialized readers.

In some embodiments, the computing device(s) 306 may operate in trust environment 302 that is separate and distinct from trust environment 304. Within trust environment 302, the computing device(s) 306 may be issued public and private key pairs that may be utilized within the trust environment 302 to verify/validate data exchanges between the computing device(s) 306. Traditionally, the public/private keys of the trust environment 302 are not known within the trust environment 304 and thus, such keys may not be used within the trust environment 304 to verify/validate data sent by the computing device(s) 306. Similarly, within trust environment 304, the computing device(s) 308 may be issued public and private key pairs that may be utilized within the trust environment 304 to verify/validate data exchanges between the computing device(s) 308. Traditionally, the public/private keys of the trust environment 304 may not be known within the trust environment 302 and thus, such keys may not be used within the trust environment 302 to verify data sent by the computing device(s) 308.

In some embodiments, the computing device(s) 306 and the computing device(s) 308 may be in communication with the trust provider computer 310. The computing device(s) 306 may provide the trust provider computer 310 with a public key that is known within the trust environment 302. The trust provider computer 310 may be configured to store the public key within a data store (e.g., the data store 312 that is communicatively coupled to the trust provider computer 310 and/or is physically located on the trust provider computer 310). In some embodiments, the data store 312 may include a block chain that is a digital ledger in which associations between a computing device and a public key (e.g., trust data) are maintained by the trust provider computer 310. In some embodiments, the trust provider computer 310 otherwise maintains (e.g., in a database, in a mapping, etc.) an association between a computing device and a corresponding public key. Thus, the functionality provided by the trust provider computer 310 may be provided in a centralized manner, or the functionality may be provided in a decentralized approach (e.g., a block chain) in which many systems are collectively responsible for maintaining trust data.

The trust provider computer 310 may be configured to receive data (e.g., a public key) from the computing device (s) 306. Upon receipt, or at a suitable time, the trust provider computer 310 may generate data (e.g., first data 314) corresponding to the computing device(s) 306. As a non-limiting example, the trust provider computer 310 may generate the first data 314 by digitally signing, using a private key associated with the trust provider computer 310, the public key received from the computing device(s) 306. The trust provider computer 310 may store the generated first data within the data store 312 (e.g., a block chain, a database), optionally with a device identifier (e.g., a phone number, a device identifier, a public key of a computing device, etc.). The data stored in the data store 312 may be referred to as "trust data." The trust provider computer 310 may provide the first data 314 (e.g., the public key that is digitally signed by the trust provider computer's private key) to the computing device(s) 306. The computing device(s) 306 may store the first data 314 on the computing device(s) 306, or in another data store that is accessible to the computing device(s) 306. In a similar manner, the computing device(s) 308 may provide their corresponding data (e.g., public keys) to the trust provider computer 310. The trust provider computer 310 may similarly generate first data 316 (the public key of the computing device(s) 308 signed by the private key of the trust provider computer 310). The trust provider computer 310 may provide the first data 316 to the computing device(s) 308 for storage on the computing device(s) 308, or within a data store accessible to the computing device(s) 308.

In some embodiments, the computing device(s) 306 may generate second data 316 utilizing a private key associated with the computing device(s) 306. For example, the second data 318 may be generated by the computing device(s) 306 by utilizing the private key of the computing device(s) 306 to digitally sign a public key of the trust environment 302 that corresponds to the computing device(s) 306. Similarly, the computing device(s) 308 may generate second data 320 by utilizing a private key of the trust environment 304 to digitally sign a public key of the trust environment 304 corresponding to the computing device(s) 308. In some examples, the second data 318 may be generated utilizing the computing device(s) 306 private key to digitally sign message data to be transmitted. Similarly, the second data 320 may be generated utilizing the computing device(s) 308 private key to digitally sign message data to be transmitted. The second data 318 and the second data 320 may be stored on the computing device(s) 306 and the computing device(s) 308, respectively, or a data store accessible to such devices.

In some embodiments, the computing device(s) 306 may utilize the first data 314 (e.g., a public key that is digitally signed using the private key of the trust provider computer 310) and the second data 318 (e.g., a public key (or message data) that is digitally signed using the private key of the computing device(s) 306) to generate a trust token. The trust token may be included in a message transmitted to the computing device(s) 308. The computing device(s) 308 may utilize the first data included in the trust token to verify (e.g., with the trust provider computer 310) that the sender (e.g., computing device(s) 306) is a trusted party. In some embodiments, the computing device(s) 308 may utilize the second data included in the trust token to verify that the message was, in fact, sent by the computing device(s) 308 and to verify the integrity of the message. If the computing device(s) 308 cannot confirm that the first data included in the message corresponds to a trusted device and/or the computing device(s) 308 cannot confirm that the second data included in the message indicates that the message was sent by the computing device(s) 306 and is unaltered, then the message may be ignored and/or other remedial actions may be taken (e.g., notifying a user of the situation).

By utilizing the techniques described in FIG. 3, a trust relationship between the computing device(s) 306 and the computing device(s) 308 may be established and managed by the trust provider computer 310 such that data exchanges between computing devices of differing trust environments may be trusted and the integrity of data messages sent between such devices may be verified. In some embodiments, the trust relationship may be established while enabling each of the computing device(s) 306 and the computing device(s) 308 to utilize the public/private key pairs previously provided within trust environment 302 and trust environment 304, respectively. Accordingly, the computing device(s) 306 and the computing device(s) 308 may utilize a single private key for communications within a trust environment as well as across trust environments.

Additional uses of the first data 314, the second data 318, the first data 316, and the second data 320 may be discussed further with respect to FIGS. 6-9.

Figure 4:
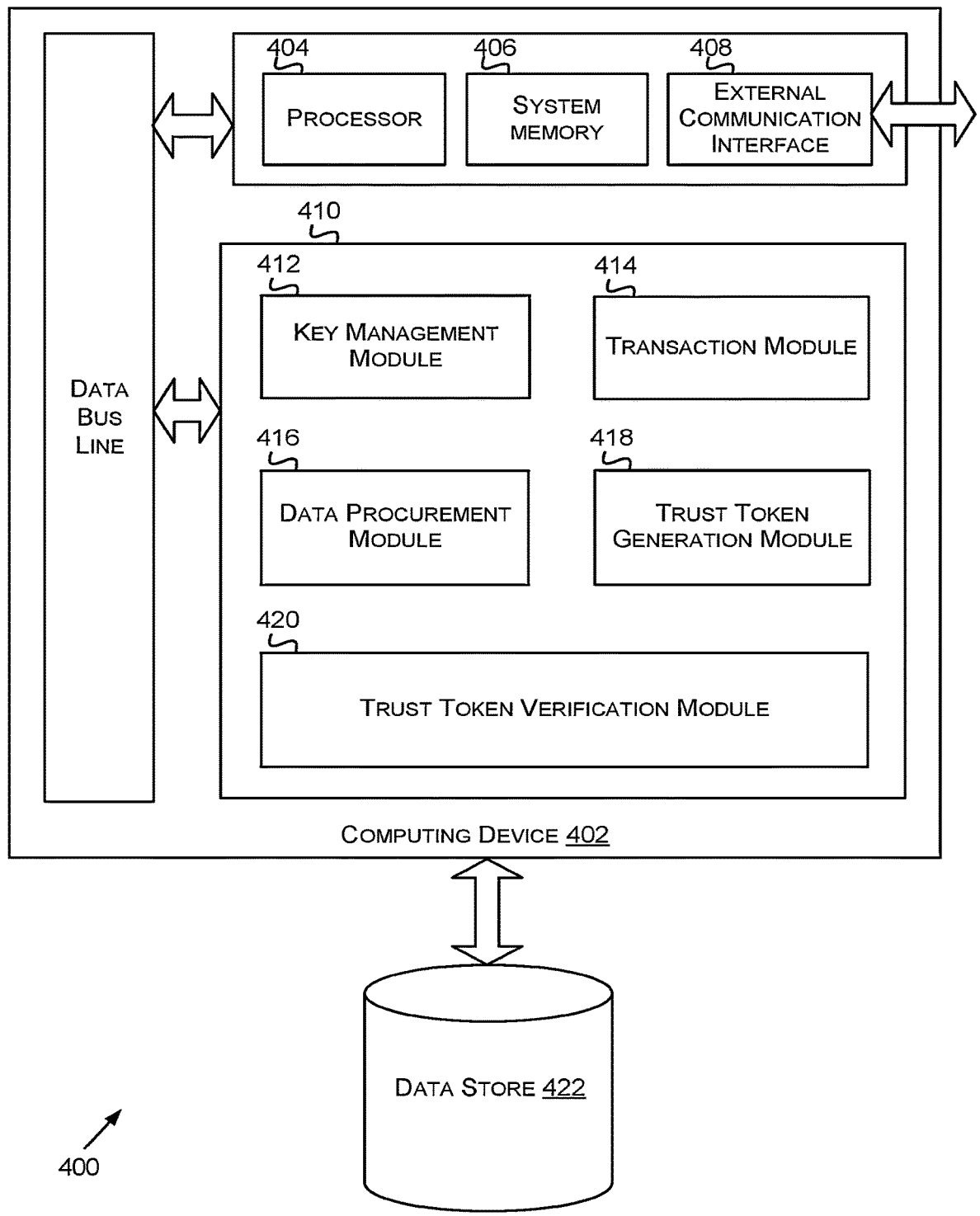
FIG. 4 depicts a block diagram of an exemplary computing device according to an embodiment of the invention, according to some embodiments.

FIG. 4 depicts a block diagram 400 of an exemplary computing device (e.g., computing device 402), according to some embodiments. The computing device 402 is intended to be an example of the computing device(s) 306 or the computing device(s) 308) of FIG. 3.

The computing device 402 may comprise a processor 404, which may be coupled to a system memory 406 and an external communication interface 408. A computer readable medium 410 may also be operatively coupled to the processor 404.

The computer readable medium 410 may comprise a number of software modules including a key management module 412, a transaction module 414, a data procurement module 416, a trust token generation module 418, and a trust token verification module 420. Although these various modules are depicted as being internal to the computing device 402, any number of these modules may instead be implemented as separate systems external to the computing device 402.

In at least one embodiment, the key management module 412 may comprise code that, when executed, causes the processor 404 to manage one or more keys. By way of example, the key management module 412 may be configured to cause the processor 404 to request and receive public/private key pairs from a key management system (e.g., a key management system of the trust environment 302 of FIG. 3). At a suitable time, the key management module 412 may be configured to cause the received public/private keys to be stored (e.g., in data store 418, a data store configured to store such information). Although data store 422 is depicted as being external to the computing device 402, it should be appreciated that, in some embodiments, the data store 422 may be internal or otherwise accessible to the computing device 402. In some embodiments, the key management module 412 (or another suitable component of the computing device 402) may be configured to cause the processor 404 to provide a public key associated with the computing device 402 to another computing device such as the trust provider computer 310 of FIG. 3.

In at least one embodiment, transaction module 414 may be configured to cause the processor 404 to receive transaction data from the computing device 402. By way of example only, the transaction data may include any suitable data for transmitting a message. As a non-limiting example, transaction data may be related to a payment transaction. In such cases, the transactions data may include an item identifier, an item price, a merchant identifier, a device identifier, payment credentials, or the like. Upon receipt of the transaction data, or at another suitable time, the processor 404 may be configured to execute code associated with the data procurement module 416 and/or the trust token generation module 418.

In some embodiments, the data procurement module 416 may be configured to cause the processor 404 to transmit messages (e.g., data request messages) and receive messages (e.g., data response messages) from a trust provider computer (e.g., the trust provider computer 310 of FIG. 3). In some embodiments, the data procurement module 416 may be configured to cause the processor 404 to include device-specific data (e.g., a public key of the device) within a data request message. In some embodiments, a data response message may include digitally signed data generated by the trust provider computer using a private key associated with the trust provider computer. By way of example, the generated token may be the public key provided in the data request message that is digitally signed by the trust provider computer using the trust provider computer's private key. The data procurement module 416 may be configured to cause the processor 404 to store at least a portion of the received digitally signed data in the data store 422, or in a location otherwise accessible to the computing device 402. In some embodiments, the digitally signed data received in a data response message may be stored in the data store 422, or another suitable storage location accessible (or physically located on) the computing device 402.

In some embodiments, the trust token generation module 418 may be configured to cause the processor 404 to generate a trust token. In some embodiments, the trust token generation module 418 may be configured to cause the processor 404 to digitally sign data (e.g., the public key associated with the computing device 402) using a private key associated with the computing device 402 to obtain device-signed data. The trust token generation module 418 may be configured to cause the processor 404 to generate a trust token from the received data that was digitally signed by the trust provider computer (e.g., a public key of the computing device 402 that was digitally signed using a private key of the trust provider computer) and the device-signed data (e.g., a public key of the computing device 402 that was digitally signed by the private key of the computing device 402).

In at least one embodiment, the trust token generation module 418 may be configured to generate transaction specific data (e.g., a nonce, a timestamp, or any other piece of variable data). The nonce may be unique for each message transmitted by the computing device 402. In some embodiments, the trust token generation module 418 may be configured to cause the processor 404 to generate a trust token from a device identifier corresponding to the computing device 402 (e.g., an alphanumeric identifier, the public key of the computing device 402, etc.), the transaction specific data (e.g., a nonce), the digitally signed data generated by the trust provider computer, the digitally signed data generated by the computing device 402, or any suitable combination of the above. At least some portion of the data used to generate the trust token may be stored in the data store 422. For example, a device identifier (e.g., a public key of the computing device 402), a nonce, etc.), the public key of the computing device 402, the digitally signed data provided by the trust provider computer, the digitally signed data generated by the computing device 402, or any suitable combination of the above may be stored as an association within data store 422. The trust token generation module 418 may be configured to cause the processor 404 to provide the generated trust token to the transaction module 414.

In at least one embodiment, the transaction module 414 may be configured to cause the processor 404 to generate and/or modify a message (e.g., an authorization request message, or any suitable message to be transmitted to another device) to include the trust token generated by the trust token generation module 418. In some embodiments, the trust token may be provided in header fields of the message.

In some embodiments, the transaction module 414 may be configured to cause the processor 404 to receive messages (e.g., an authorization response message) from another device. Upon receipt of a message, or at another suitable time, the transaction module 414 may be configured to cause the processor 404 to provide at least a portion of the received message data to the trust token verification module 420.

In some embodiments, the trust token verification module 420 may be configured to cause the processor 404 to obtain a portion of the message data that corresponds to digitally signed data supposedly provided by the trust provider computer. The trust token verification module 420 may be configured to cause the processor 404 to transmit verification request messages to, and receive verification response messages from, a trust provider computer. A trust verification request message may include at least the portion of the message data that corresponds to the digitally signed data supposedly provided by the trust provider computer. Upon receipt of a verification response message, the trust token verification module 420 may be configured to cause the processor 404 to determine from the response (e.g., by an indicator included in the response, by the mere receipt of the response, or another suitable method) whether the sender of the data message is trusted by the trust provider computer.

By way of example, the verification response message may include an indicator that indicates that the digitally signed data provided in the request corresponds to a trusted device or that the digitally signed data provided in the request does not correspond to a trusted device. The trust token verification module 420 may be configured to cause the processor 404 to cease further processing if the response indicates that the digitally signed data provided in the request does not correspond to a trusted device.

In some embodiments, the verification response message received from the trust provider computer may include a public key associated with a trusted party (e.g., the sender of the original message). The trust token verification module 420 may utilize the public key provided in the verification response message to verify that the purported sender of the message was the actual sender. Additionally, the integrity of the received message data may be verified using the public key.

For example, the trust token verification module 420 may utilize the public key to verify message data was signed using a correct private key. In other embodiments, the trust token verification module 420 may be configured to utilized to obtain a hash of the message data (e.g., from a data field of the message) as calculated by the message sender. The hash may have been calculated by the message sender using any suitable combination of message fields or the entire message. The trust token verification module 420 may cause the processor 404 to compute a hash value of the message data, or some portion of the message data, and compare the computed hash value to the obtained hash value. If the values match, the trust token verification module 420 may be configured to cause the processor 404 to indicate to the transaction module 414 that the message is valid, or in other words, the message has not been altered. If the values do not match, the trust token verification 420 may be configured to cause the processor 404 to indicate to the transaction module 414 that the message is invalid, or in other words, the message has been altered. The transaction module 414 may be configured to cause the processor 404 to perform one or more remedial actions (e.g., cease processing the message, notify a user, etc.) if the message is determined to be invalid. In some embodiments, the transaction module 414 may be configured to cause the processor 404 to perform the functionality discussed herein with respect to the trust token verification module 420.

As another example of message integrity verification, the public key may be used to verify message data corresponding to a source identifier (e.g., a public key) of the sender. If the obtained source identifier matches a source identifier provided in the message, then the message may be considered valid (e.g. unaltered). If the obtained source identifier does not match the source identifier provided in the message, then the message may be considered invalid (e.g., altered).

Figure 5:
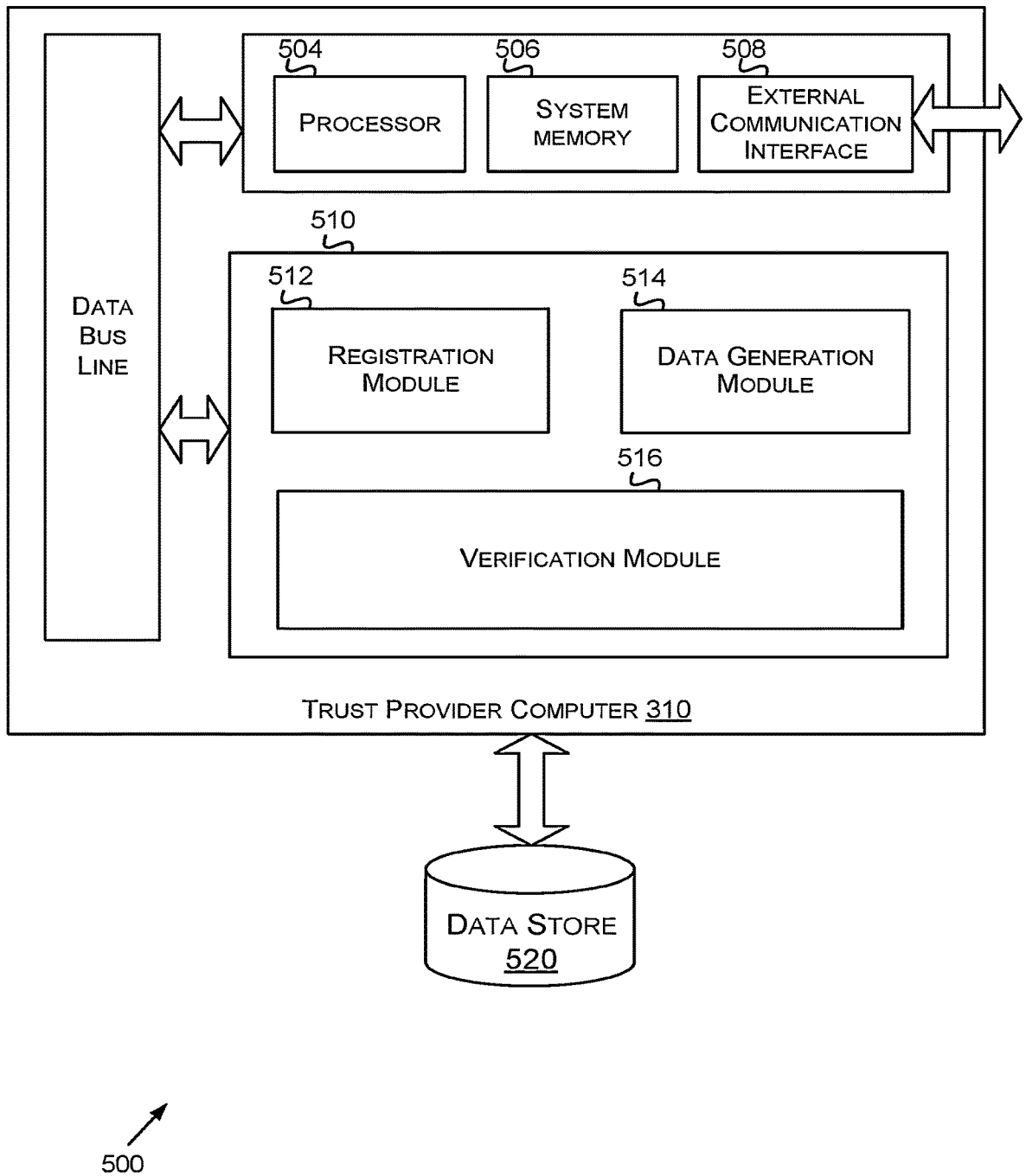
FIG. 5 depicts a block diagram of an exemplary trust provider computer according to an embodiment of the invention, according to some embodiments.

FIG. 5 shows a block diagram 500 of a trust provider computer (e.g., trust provider computer 310 of FIG. 3) according to an embodiment of the invention.

The trust provider computer 310 may comprise a processor 504, which may be coupled to a system memory 506 and an external communication interface 508. A computer readable medium 510 may also be operatively coupled to the processor 504. Computer readable medium 510 may also comprise code for implementing the methods discussed herein.

The computer readable medium 510 may comprise a number of software modules including a registration module 512, a data generation module 514, and a verification module 518. Although these various modules are depicted as being internal to the trust provider computer 310, any number of these modules may instead be implemented as separate systems external to the trust provider computer 310.

The registration module 512 may comprise code which can cause the processor 504 to receive a public key associated with a computing device. The public key may be received from the computing device 402 or from another device. The public key may correspond to a computing device operated by, or on behalf of, a user, an authorizing entity (e.g., an issuer), a service provider (e.g., a digital wallet provider), a resource provider (e.g., a merchant, an e-commerce merchant, a transit authorities, a building access authority, etc.), a transaction processor (e.g., a payment processing network), a transport provider (e.g., an acquirer), a mobile device (e.g., a mobile device corresponding to the computing device(s) 306 of FIG. 3), or subcomponents and applications thereof. The registration module 512 may be configured to cause the processor 504 to store the received public key of the computing device 402 within data store 520 (or another suitable storage location accessible to, or physically located on, the trust provider computer 310. In some embodiments, the data store 520 may include a block chain (e.g., a digital ledger) that is managed by the trust provider computer 310.

The data generation module 514 may be configured to cause the processor 504 to receive data request messages and transmit data response messages. The data generation module 514 may further cause the processor 504 to generate digitally signed data in response to a data request message from a data requestor (e.g., the computing device 402 of FIG. 4). In one embodiment, the data generation module 514 may cause the processor 504 to receive a data request message. The data request message may include the public key of the data requestor, or the public key of the requestor may be identified from the data store 520. In some embodiments, the data generation module 514 may cause the processor 504 to generate digitally signed data (e.g., by digitally signing the public key of the computing device with a private key associated with the trust provider computer 310). The data store 520 may be utilized by the processor 504 to store the generated digitally signed data alone, or as an association with the public key of the computing device. In some embodiments, if a digitally signed data cannot be generated, a data response message may be transmitted by the processor 504 to the requestor indicating a reason the signed data could not be generated.

The verification module 516 may comprise code, executable by the processor 504, to cause the processor 504 to receive verification request messages and transmit verification response messages. The verification module 516 may be configured to cause the processor 504 to utilize data contained in a verification request message to verify an identity of an entity (e.g., a computing device). For example, the data contained in the verification request may include digitally signed data that was supposedly provided by the trust provider computer 310. In some embodiments, the digitally signed data may include a public key, associated with a computing device that was signed using the private key of the trust provider computer 310.

In some embodiments, the verification module 516 may cause the processor 504 to utilize a public key associated with the trust provider computer 310 to verify that the received digitally signed data was in fact signed by the trust provider computer 310. Additionally, or alternatively, the verification module 516 may cause the processor 504 to utilize the digitally signed data to perform a lookup within the data store 520. In some embodiments, the processor 504 may utilize the digitally signed data to perform a lookup of data contained in the data store 520 (e.g., a database, a block chain, etc.). If the lookup indicates that the digitally signed data is contained in the data store 520, then the verification module 516 may be configured to cause the processor 504 to transmit a verification response message indicating that the entity corresponding to the public key/digitally signed data is trusted. If the lookup indicates that the public key and/or digitally signed data is not contained in the data store 520, then the verification module 516 may be configured to cause the processor 504 to transmit a verification response message indicating that the entity is not verifiable and/or untrusted.

Figure 6:
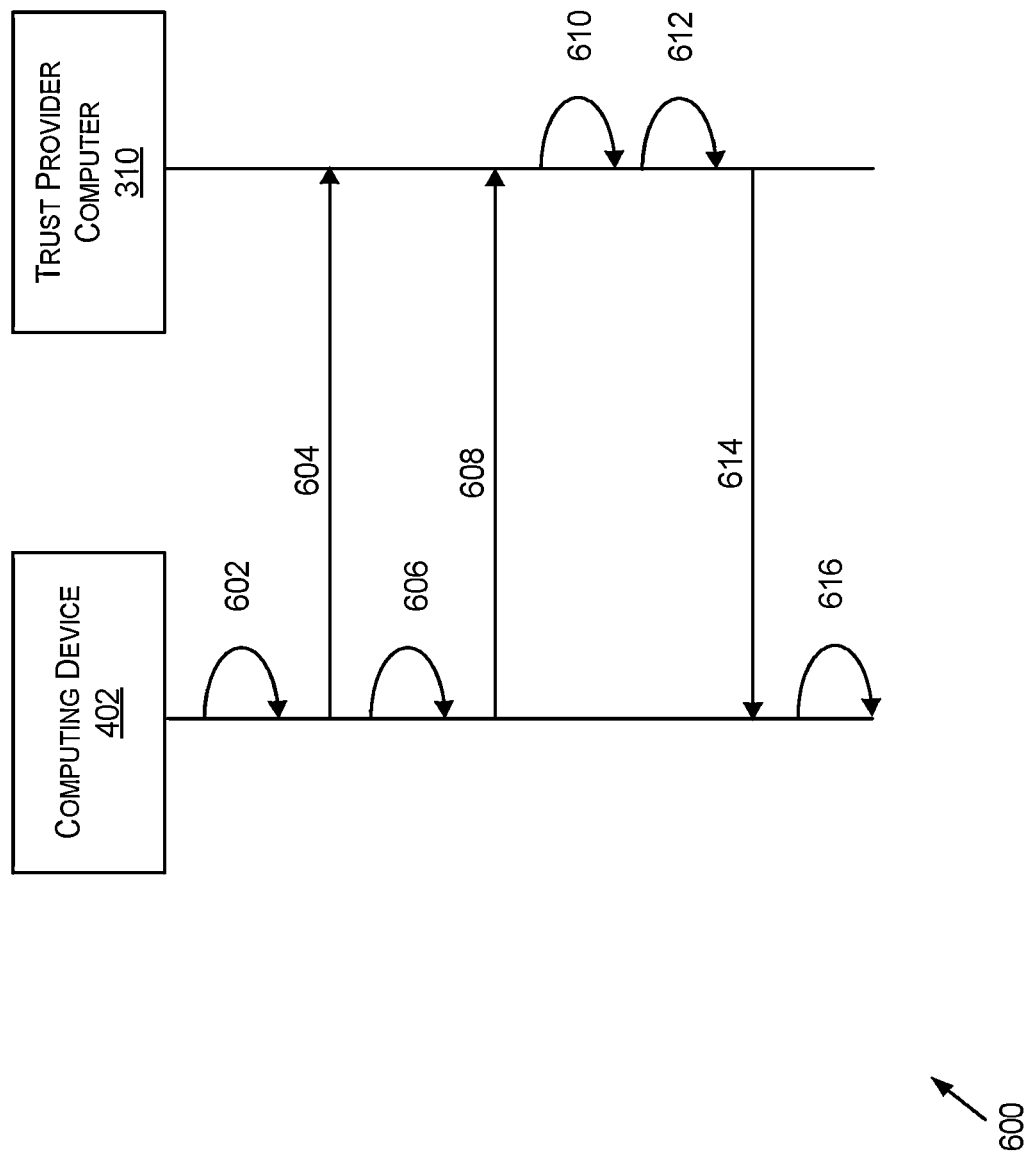
FIG. 6 depicts a flow diagram for an exemplary method for obtaining digitally signed data generated by a trust provider computer, according to some embodiments.

FIG. 6 depicts a flow diagram for an exemplary method 600 for obtaining digitally signed data generated by a trust provider computer (e.g., the trust provider computer 310 of FIGS. 3 and 5), according to some embodiments. In at least one embodiment, the digitally signed data may be a public key of a computing device (e.g., the computing device 402 of FIG. 4) that is signed using a private key associated with a trust provider computer (e.g., the trust provider computer 310 of FIGS. 3 and 5). The method 600 may begin at 602 where the computing device 402 (e.g., using the key management module 412 of the computing device 402) obtains a public/private key pair. As described in connection with FIG. 3, the public/private key pair may be provided by a key management system (not shown) that is responsible for managing keys with a particular trust environment (e.g., the trust environment 302 of FIG. 3).

At 604, the computing device 402 (e.g., the key management module 412) may provide its public key to the trust provider computer 310. Upon receipt, or at another suitable time, the trust provider computer 310 may store the public key of the computing device 402. For example, the public key may be stored in a block chain or another suitable storage container accessible to the trust provider computer 310.

At 606, the computing device 402 (e.g., the transaction module 414) may receive transaction data corresponding to a message to be transmitted. As discussed above, the actual content of the transaction data may vary depending on the type of message to be transmitted. As an example, the message to be transmitted may be a message related to a payment transaction. Accordingly, the transaction data may include payment information (e.g., a PAN), a price, an item identifier, a merchant identifier, a device identifier (e.g., a phone number) associated with the computing device 402, or the like.

At 608, the computing device 402 (e.g., using the data procurement module 416) may transmit a data request message to the trust provider computer 310. The public key of the computing device 402, or another device identifier, of the computing device 402 may be included in the data request message. In some cases, the public key of the computing device 402 may be provided at 608 without having previously been provided at 604.

At 610, the trust provider computer 310 may utilize its private key to sign the public key provided by the computing device 402. In some embodiments, prior to signing the public key, the trust provider computer 310 may perform operations to determine that the computing device 402 is to be trusted (e.g., the trust provider computer 310 may query another device such as a key management system to determine trustworthiness of the computing device 402).

At 612, the trust provider computer 310 may store digitally signed data (e.g., the public key of the computing device 402 signed with the private key of the trust provider computer 310). In some examples, the digitally signed data may be stored in a block chain (e.g., a digital ledger managed by the trust provider computer 310). In some examples, the digitally signed data may be stored and associated with the public key (and/or other device identifier) of the computing device 402. Accordingly, the data may be retrieved using either the digitally signed data or the public key as a lookup key.

At 614, the trust provider computer 310 may transmit a data response message including the digitally signed data (e.g., the signed public key) to the computing device 402. The digitally signed data may be stored (e.g., by the data procurement module 416) at the computing device 402 (or a data store accessible to the computing device 402) at 616.

Figure 7:
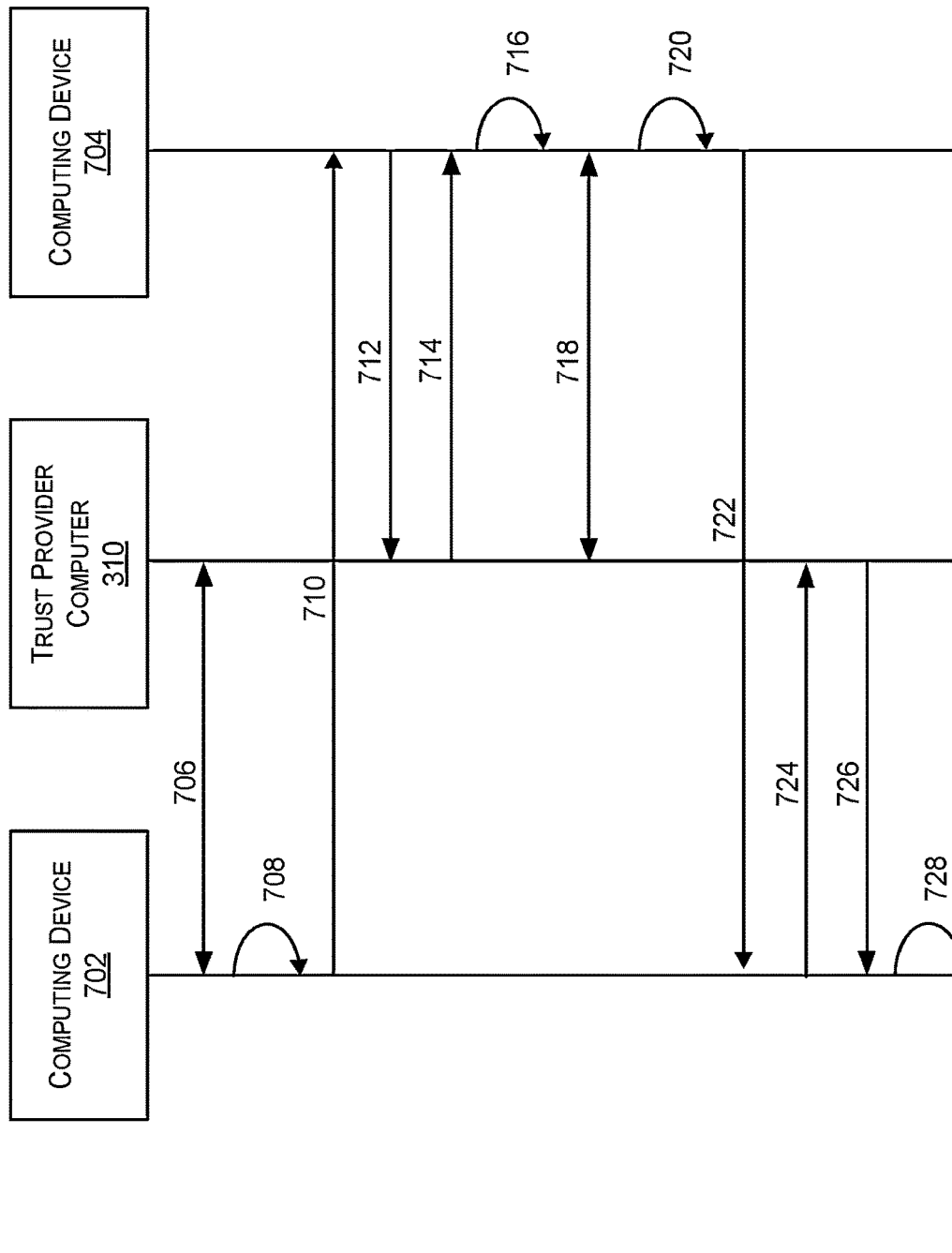
FIG. 7 depicts a flow diagram for an exemplary method for utilizing trust tokens to conduct secure message exchanges between computing devices, according to some embodiments.

FIG. 7 depicts a flow diagram for an exemplary method 700 for utilizing trust tokens to conduct secure message exchanges between computing devices (e.g., the computing device 702 and the computing device 704), according to some embodiments. The computing device 702 may be an example of the computing device(s) 306 of FIG. 3. The computing device 704 may be an example of the computing device(s) 308 of FIG. 3. The method 700 may begin at 706, where the computing device 702 (e.g., an example of the computing device(s) 306 of FIG. 3) may conduct operations for obtaining digitally signed data from the trust provider computer 310. Such operations may include the steps discussed with respect to FIG. 6.

Figure 8:
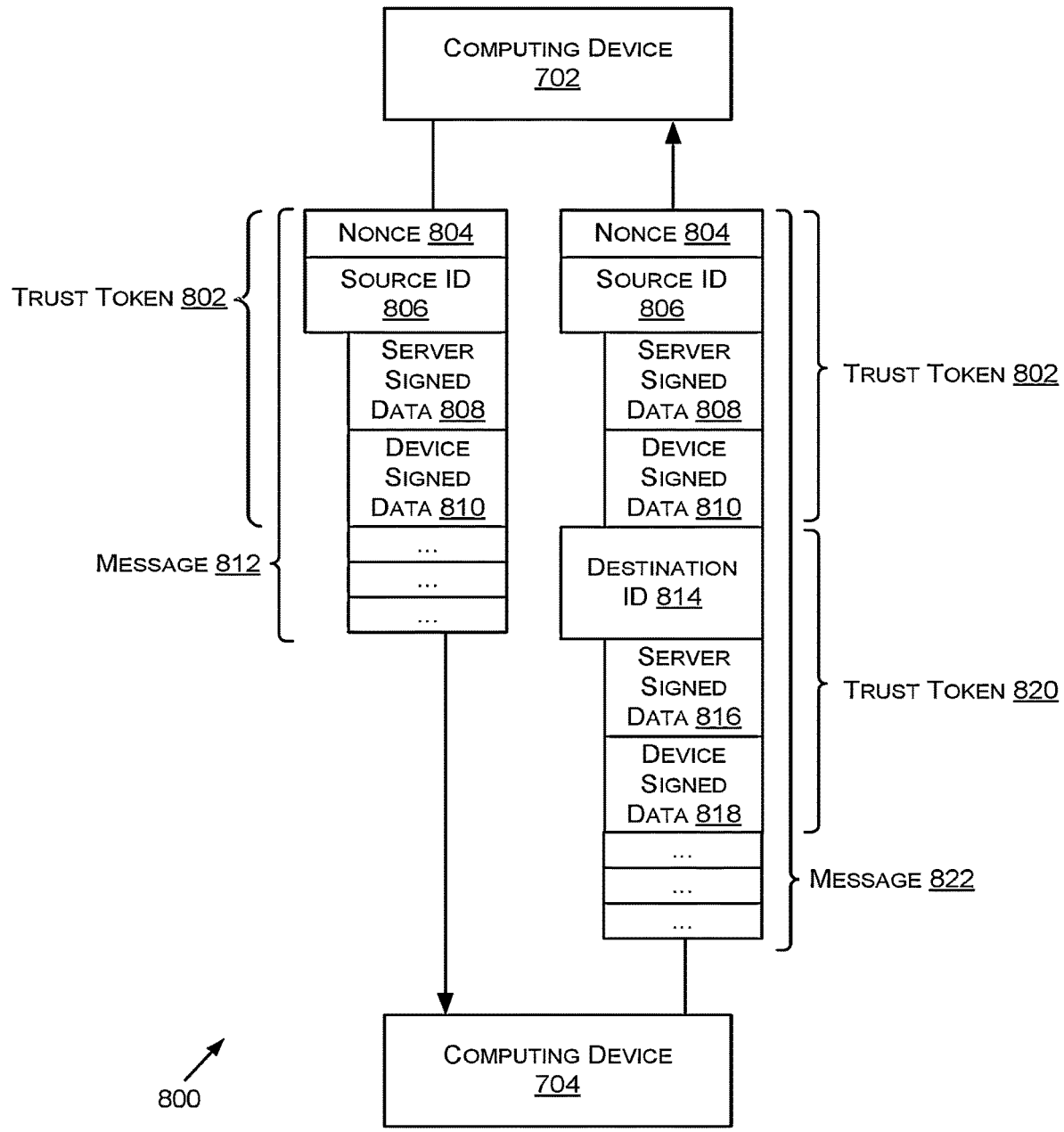
FIG. 8 depicts an exemplary message format for utilizing trust tokens to conduct secure message exchanges between computing devices, according to some embodiments.

At 708, the computing device 702 (e.g., using the trust token generation module 418) may generate a trust token for the message to be transmitted. An exemplary message format 800 for utilizing trust tokens is depicted in FIG. 8. The trust token 802 may correspond to the trust token generated at 708. As depicted in FIG. 8, the trust token 802 may include nonce 804, source ID 806 (e.g., a public key or another device identifier of the computing device 702), server signed data 808 (e.g., the digitally signed data signed with the private key of the trust provider computer 310), device signed data 810 (e.g., digitally signed data generated by the computing device 702 using its private key). In some embodiments, the device signed data 810 may be generated using the source ID 806 or any suitable message data from the message 812. In some embodiments, the computing device 702 may store the data used to generate the trust token (e.g., the nonce 804, the source ID 806, the server signed data 808, and the device signed data 810) for later verification.

At 710, the computing device 702 (e.g., using the transaction module 414) may insert the trust token and transmit the message to the computing device 704. The trust token may form part of the header for the message in some embodiments. In some embodiments, the transmitted message may correspond to the message 812 of FIG. 8. The message 812 may include additional message data with the trust token 802.

At 712, the computing device 704 (e.g., using the trust token verification module 420) may transmit a verification request message to the trust provider computer 310 requesting that the identity of the sender be verified. For example, the verification request message may include the server signed data 808 of FIG. 8. Upon receipt, the trust provider computer 310 may verify that the server signed data 808 corresponds to a trusted device (e.g., the computing device 702). For example, the trust provider computer 310 may utilize the server signed data 808 to query its data store.

At 714, the trust provider computer 310 may transmit a verification response message to the computing device 704. If data corresponding to the server signed data 808 is found, the trust provider computer 310 may indicate within the verification response message that the computing device 702 is a trusted device and the method may proceed. If data corresponding to the server signed data 808 is not found, the trust provider computer 310 may indicate in the verification response message that the computing device 702 is not trusted. In some embodiments, if the computing device 702 is not trusted, the computing device 704 may cease processing the message received at 710 (or perform another remedial action) and the method 700 may conclude. In at least one embodiment, the verification response message received at 714 may include the public key of the computing device 702.

At 716, the computing device 704 (e.g., using the trust token verification module 420) may verify the identity of the sender and/or the integrity of the message received at 710. For example, the computing device 704 may utilize the public key provided in the verification response message received at 714 from the trust provider computer 310. The public key may be utilized as described above to verify that computing device 702 was the device that signed device signed data 808 and that the message data of the message received at 710 (e.g., message 812) has not been altered. If the identity of the sender is not verified, or the message has been altered, the computing device 704 may cease processing the message received at 710 (or perform another remedial action) and the method 700 may conclude. If the identity of the sender is verified and the message has not been altered, the method may proceed.

At 718, or another suitable time, the computing device 704 (e.g., an example of the computing device(s) 308 of FIG. 3) may conduct operations for obtaining digitally signed data from the trust provider computer 310. Such operations may include the steps discussed with respect to FIG. 6. The digitally signed data may be generated by the trust provider computer 310 by signing a public key associated with the computing device 704 using the private key of the trust provider computer 310. The digitally signed data obtained at 714 may correspond to the server signed data 816 of FIG. 8.

At 720, the computing device 704 (e.g., using the trust token generation module 418) may generate a trust token from the digitally signed data obtained at 718. The trust token may correspond to the trust token 820 of FIG. 8. As depicted in FIG. 8, the trust token 820 may include destination ID 814, server signed data 816 corresponding to the digitally signed data obtained at 714, and device signed data 818. Device signed data 818 may be generated by the computing device 704 (e.g., using the trust token generation module 418) using the private key of the computing device 704. For example, the device signed data 818 may be the public key of the computing device 704 after being signed by the private key of the computing device 704. In some embodiments, the device signed data 818 may be generated using the destination ID 814 (e.g., a public key, a device identifier, etc.) or any suitable message data from the message 822.

At 722, the computing device 704 (e.g., using the transaction module 414) may insert the trust token generated at 720 and transmit a message to the computing device 702. In some embodiments, the transmitted message may correspond to the message 822 of FIG. 8. The message 822 may include additional message data with the trust token 820. For example, the message 822 may include the trust token 802 received in message 812 at 710 as well as the trust token 820. In some embodiments, message 822 may include additional data with the trust token 802 and the trust token 820.

At 724, the computing device 704 (e.g., using the trust token verification module 420) may send a verification request message to the trust provider computer 310. For example, the verification request message may include the server signed data 816 of FIG. 8 extracted from the message received at 722. The trust provider computer 310 may verify that the server signed data 816 corresponds to a trusted device (e.g., the computing device 704). For example, the trust provider computer 310 may utilize the server signed data 816 to query its data store.

If data corresponding to the server signed data 816 is found, the trust provider computer 310 may transmit a verification response message at 726 that indicates that the computing device 704 is a trusted device and the method may proceed. If data corresponding to the server signed data 816 is not found, the trust provider computer 310 may indicate in the verification response message sent at 726 that the computing device 704 is not trusted. In some embodiments, if the computing device 704 is not trusted, the computing device 702 may cease processing the message received at 722 (or perform another remedial action) and the method 700 may conclude. In at least one embodiment, the verification response message received at 726 may include the public key of the computing device 704.

At 728, after receiving a verification response message that indicates that the computing device 704 is trusted, the computing device 702 (e.g., using the trust token verification module 420) may verify the identity of the sender (e.g., the computing device 704) and/or the integrity of the message received at 722. For example, the computing device 702 may utilize the public key provided in the verification response message received at 726 from the trust provider computer 310. The public key may be utilized as described above to verify that computing device 704 was the device that signed device signed data 818 and that the message data of the message received at 722 (e.g., message 822) has not been altered. If the identity of the sender is not verified, or the message has been altered, the computing device 702 may cease processing the message received at 722 (or perform another remedial action) and the method 700 may conclude. If the identity of the sender is verified and the message has not been altered, computing device 702 may continue to process the content of the message received at 722.

By utilizing the techniques described above, trust may be established between two devices of different trust environments. Furthermore, by utilizing the trust tokens (e.g., the trust token 802 and the trust token 820 of FIG. 8) within message exchanged between the two devices, the likelihood of detecting relay, replay, or other MITM attacks may be increased (due to the ability to verify trust of the sender and integrity of the message), decreasing the likelihood that such attacks are successful.

Returning to the relay example of FIG. 1, the contactless terminal 102 and the contactless card 104 may be trusted devices for which trust is managed by a trust provider computer (e.g., the trust provider computer 310 of FIG. 3). When sending the message at step 1 requesting sensitive information, the contactless terminal 102 may utilize the techniques discussed herein to include a trust token (e.g., the trust token 802). When the message is modified by the attacker device 108 and provided to the contactless card 104, the contactless card 104 may utilized the techniques discussed herein to verify the trust of the attacker device 108 (e.g., the sender of the modified message). If the attacker device 108 is not a trusted device (as determined by the trust provider computer 310), then the contactless card 104 can discard or otherwise ignore the message. Thus, the contactless card 104 will not provide sensitive information to an untrusted device.

If the attacker device 108 is determined by the trust provider computer 310 to be a trusted device, then the contactless card 104, utilizing the techniques discussed herein, may utilize the trust token provided in the message at step 3 of FIG. 1 to verify the identity of the sender and the integrity of the message. Because the trust token includes data that was signed by the contactless terminal 102, the public key of the attacker device 108 can be used to verify that the message was not signed by the attacker device 108 and that the message has been altered in some way. If the message was not signed by the attacker device 108 and/or the message has been altered, the contactless card 104 can discard or otherwise ignore the message. Thus, the contactless card 104 may not provide sensitive information to the attacker device 108.

Similar techniques may be utilized with respect to FIG. 2 to detect other MITM attacks. As described above, the message sent at step 1 of FIG. 2 may include a trust token (e.g., the trust token 802 corresponding to the source device 202). If the attacker device 206 attempts to alter the message, the destination device 204 can utilize the trust token to determine that 1) the attacker device 206 is trusted or not trusted, 2) the attacker device 206 signed or did not sign the data provided in the message, and/or 3) that the message is unaltered or has been altered. For the message received by the source device 202, the trust token of the destination device 204 (e.g., the trust token 820) may be utilized for the same purposes. Accordingly, both the source device 202 and the destination device 204 may detect the MITM attack.

Figure 9:
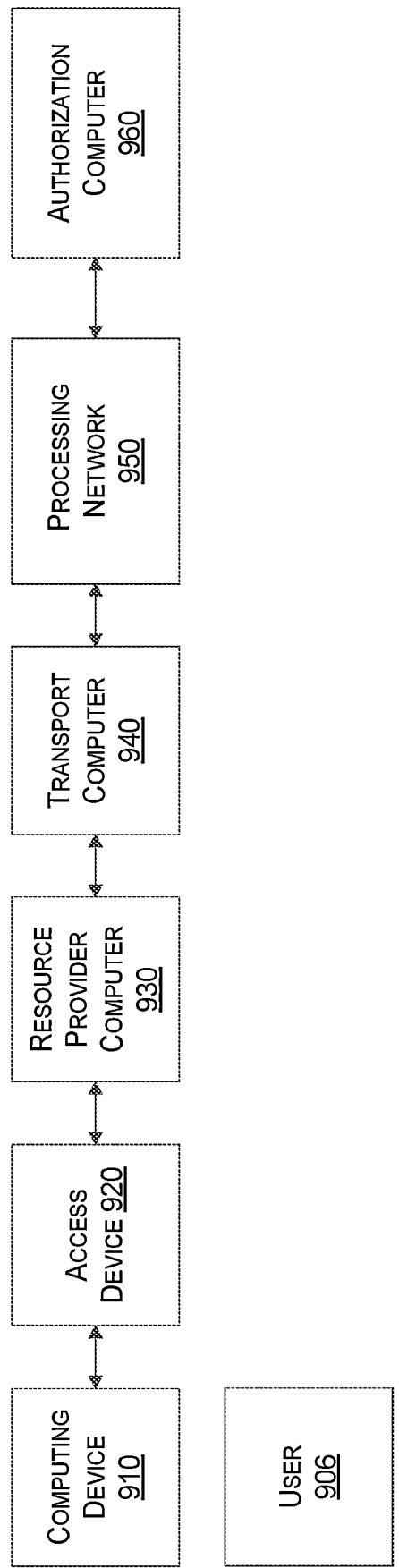
FIG. 9 depicts a block diagram of a transaction processing system that can utilize trust tokens to perform transactions.

FIG. 9 depicts a block diagram of a transaction processing system that can utilize trust tokens to perform transactions (e.g., payment transactions). FIG. 9 shows a user 906 that can operate a computing device 910 (e.g., an example of the computing device(s) 302 of FIG. 3). The user 906 may use the computing device 910 to pay for a good or service at a resource provider such as a merchant. The resource provider may operate a resource provider computer 930 and/or an access device 920. The resource provider may communicate with an authorization computer 960 (e.g., an issuer computer) via a transport computer 940 (e.g., an acquirer computer) and a processing network 950 (e.g., a payment processing network).

The processing network 950 may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network may use any suitable wired or wireless network, including the Internet.

A payment transaction flow using the computing device 910 at an access device 920 (e.g. POS location) can be described as follows. A user 906 presents his or her computing device 910 to an access device 920 to pay for an item or service. The computing device 910 and the access device 920 exchange one or more messages such that access data from the computing device 910 (e.g., a PAN, a payment token, verification value(s), expiration date, etc.) is received by the access device 920 (e.g. via contact or contactless interface). The resource provider computer 930 may then receive this information from the access device 920 via an external communication interface. The resource provider computer 930 may then generate an authorization request message that includes the information received from the access device 920 (i.e. information corresponding to the computing device 910) along with additional transaction information (e.g., a transaction amount, merchant specific information, etc.) and electronically transmits this information to a transport computer 940. The transport computer 940 may then receive, process, and forward the authorization request message to a processing network 950 for authorization.

In general, prior to the occurrence of a credit or debit-card transaction, the processing network 950 has an established protocol with each authorization computer on how the issuer's transactions are to be authorized. In some cases, such as when the transaction amount is below a threshold value, the processing network 950 may be configured to authorize the transaction based on information that it has about the user's account without generating and transmitting an authorization request message to the authorization computer 960. In other cases, such as when the transaction amount is above a threshold value, the processing network 950 may receive the authorization request message, determine the issuer associated with the computing device 910, and forward the authorization request message for the transaction to the authorization computer 960 for verification and authorization. Once the transaction is authorized, the authorization computer 960 may generate an authorization response message (that may include an authorization code indicating the transaction is approved or declined) and transmit this electronic message via its external communication interface to processing network 950. The processing network 750 may then forward the authorization response message to the transport computer 940, which in turn may then transmit the electronic message to comprising the authorization indication to the resource provider computer 930, and then to the access device 920.

At the end of the day or at some other suitable time interval, a clearing and settlement process between the resource provider computer 930, the transport computer 940, the processing network 950, and the authorization computer 960 may be performed on the transaction.

By utilizing the trust tokens and techniques discussed above, trustworthiness and message validity for any message exchanged between any two devices of FIG. 9 may be verified. In some embodiments, a trust provider computer (e.g., the trust provider computer 310) may maintain information (e.g., the public key) associated with each trusted device. Trust tokens may be generated and provided in transmitted message and utilized by the receiving device to verify that the sender is a trusted party, that the sender signed the message, and that the message was unaltered. The payment transaction depicted in FIG. 9 is for exemplary purposes only. It should be appreciated that the techniques discussed herein may be utilized between any two devices. For example, an access terminal for a building may exchange data utilizing trust tokens with a computing device that provides a code for obtaining access to the building.

As described, the inventive service may involve implementing one or more functions, processes, operations, or method steps. In some embodiments, the functions, processes, operations, or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A method, comprising:
   receiving, by a second computing device from a first computing device, a first message comprising a first trust token associated with the first computing device and comprising first digitally signed data and second digitally signed data, the first digitally signed data being an identifier of the first computing device that is digitally signed by a trust provider computer using a private key of the trust provider computer and the second digitally signed data being the identifier of the first computing device that is digitally signed by the first computing device using a private key of the first computing device;
   verifying, by the second computing device, the second digitally signed data;
   generating, by the second computing device, a second message, the second message comprising the first trust token associated with the first computing device and a second trust token that is associated with the second computing device and comprises a first digitally signed data portion being an identifier of the second computing device that is digitally signed by the trust provider computer using the private key of the trust provider computer and a second digitally signed data portion being the identifier of the second computing device that is digitally signed by the second computing device using a private key of the second computing device; and
   transmitting, by the second computing device, the second message to the first computing device, wherein, upon receipt of the second message, the first computing device determines that the second message is valid by:
   obtaining, from the trust provider computer, an indication that the first digitally signed data portion of the second trust token is valid, and
   validating the second digitally signed data portion of the second trust token.

2. The method of claim 1, wherein the identifier of the second computing device, includes a public key of the second computing device.

3. The method of claim 2, further comprising:
   obtaining, by the second computing device, the public key and the private key of the second computing device from a key management module that is distinct from the trust provider computer.

4. The method of claim 1, wherein the identifier of the first computing device includes a public key associated with the first computing device that corresponds to the private key of the first computing device.

5. The method of claim 1, wherein the first trust token is generated by the first computing device based at least in part on a nonce provided by the first computing device.

6. The method of claim 1, wherein the first trust token is generated by the first computing device based at least in part on a source identifier corresponding to the first computing device.

7. The method of claim 1, wherein the second message comprises a nonce originally generated by the first computing device.

8. The method of claim 1, further comprising:
   receiving, from the trust provider computer, fourth digitally signed data, the fourth digitally signed data formed by the trust provider computer by signing public data with the private key associated with the trust provider computer,
   wherein the second message comprises the fourth digitally signed data.

9. The method of claim 1, wherein the trust provider computer manages a trust relationship between the first computing device and the second computing device.

10. The method of claim 1, further comprising:
    validating the first trust token utilizing the trust provider computer by transmitting, to the trust provider computer, a verification request message comprising a portion of the first trust token; and
    receiving, from the trust provider computer, a verification response message corresponding to the verification request message, the verification response message comprising an indication that the first computing device is trusted.

11. The method of claim 1, wherein the verifying, by the second computing device, the first digitally signed data comprises verifying the first digitally signed data using a public key of the trust provider computer.

12. The method of claim 1, wherein the second message comprises content, and the first computing device processes the content after the second computing device determines that the second message is valid.

13. A second computing device comprising:
    a processor, and
    a non-transitory computer readable medium coupled to the processor, the non-transitory computer readable medium comprising code for causing the processor to perform operations including:
    receiving, from a first computing device, a first message comprising a first trust token associated with the first computing device and comprising first digitally signed data and second digitally signed data, the first digitally signed data being an identifier of the first computing device that is digitally signed by a trust provider computer using a private key of the trust provider computer and the second digitally signed data being the identifier of the first computing device that is digitally signed by the first computing device using a private key of the first computing device;

verifying the second digitally signed data;

generating a second message, the second message comprising the first trust token associated with the first computing device and a second trust token that is associated with the second computing device and comprises a first digitally signed data portion being an identifier of the second computing device that is digitally signed by the trust provider computer using the private key of the trust provider computer and a second digitally signed data portion being the identifier of the second computing device that is digitally signed by the second computing device using a private key of the second computing device; and transmitting the second message to the first computing device, wherein, upon receipt of the second message, the first computing device determines that the second message is valid by:

obtaining, from the trust provider computer, an indication that the first digitally signed data portion of the second trust token is valid, and validating the second digitally signed data portion of the second trust token.

14. The second computing device of claim 13, wherein the identifier of the second computing device comprises a public key of the second computing device.

15. The second computing device of claim 14, wherein the operations further include:

obtaining the public key and the private key from a key management module that is distinct from the trust provider computer.

16. The second computing device of claim 13, wherein the operations further include:

validating the first trust token utilizing the trust provider computer by:

transmitting, to the trust provider computer, a verification request message comprising a portion of the first trust token; and receiving, from the trust provider computer, a verification response message corresponding to the verification request message, the verification response message comprising an indication that the first computing device is trusted.

17. The second computing device of claim 13, wherein the identifier of the first computing device comprises a public key associated with the first computing device that corresponds to the private key of the first computing device.

18. The second computing device of claim 13, wherein the non-transitory computer readable medium comprises a trust token generation module.

19. The second computing device of claim 13, wherein the second message comprises a nonce and a source identifier originated with the first computing device.

20. A system comprising:

a first computing device; and a second computing device comprising a first processor, and a first non-transitory computer readable medium coupled to the first processor, the first non-transitory computer readable medium comprising code for causing the first processor to perform operations including:

receiving, from the first computing device, a first message comprising a first trust token associated with the first computing device and comprising first digitally signed data and second digitally signed data, the first digitally signed data being an identifier of the first computing device that is digitally signed by a trust provider computer using a private key of the trust provider computer and the second digitally signed data being the identifier of the first computing device that is digitally signed by the first computing device using a private key of the first computing device;

verifying the second digitally signed data;

generating a second message, the second message comprising the first trust token associated with the first computing device and a second trust token that is associated with the second computing device and comprises a first digitally signed data portion being an identifier of the second computing device that is digitally signed by the trust provider computer using the private key of the trust provider computer and a second digitally signed data portion being the identifier of the second computing device that is digitally signed by the second computing device using a private key of the second computing device; and transmitting the second message to the first computing device, wherein the first computing device comprises a second processor and a second non-transitory computer readable medium coupled to the second processor, the second non-transitory computer readable medium comprising code for causing the second processor to perform operations including:

determining that the second message is valid by:

obtaining, from the trust provider computer, an indication that the first digitally signed data portion of the second trust token is valid, and validating the second digitally signed data portion of the second trust token.

* * * * *